US012675422B2

(12) United States Patent
Devaux et al.

(10) Patent No.: US 12,675,422 B2
(45) Date of Patent: Jul. 7, 2026

(54) PROCESSING SEARCH REQUESTS

(71) Applicant: AMADEUS S.A.S., Biot (FR)

(72) Inventors: Yannick Devaux, Biot (FR); Frederic Lobello, Biot (FR)

(73) Assignee: AMADEUS S.A.S., Biot (FR)

( * ) Notice: Subject to any disclaimer, the term of this patent is extended or adjusted under 35 U.S.C. 154(b) by 0 days.

(21) Appl. No.: 18/825,528

(22) Filed: Sep. 5, 2024

(65) Prior Publication Data

US 2025/0077450 A1 Mar. 6, 2025

(30) Foreign Application Priority Data

Sep. 6, 2023 (EP) ..................................... 23315343

(51) Int. Cl.
G06F 13/20 (2006.01)
(52) U.S. Cl.
CPC .......... G06F 13/20 (2013.01); *G06F 2213/40* (2013.01)
(58) Field of Classification Search
None
See application file for complete search history.

(56) References Cited

U.S. PATENT DOCUMENTS

| | | | | | |
|---|---|---|---|---|---|
| 4,530,055 | A | * | 7/1985 | Hamstra | ............... G06F 12/127 |
| | | | | | 711/143 |
| 6,055,564 | A | | 4/2000 | Phaal | |
| 6,147,977 | A | | 11/2000 | Thro et al. | |
| 6,157,963 | A | * | 12/2000 | Courtright, II | ......... G06F 3/061 |
| | | | | | 710/5 |

| | | | | | |
|---|---|---|---|---|---|
| 6,658,485 | B1 | | 12/2003 | Baber et al. | |
| 6,728,849 | B2 | * | 4/2004 | Kodama | ............. G06F 11/2069 |
| | | | | | 711/158 |
| 6,834,315 | B2 | * | 12/2004 | Johnson | ................ G06F 3/0689 |
| | | | | | 710/6 |
| 7,333,974 | B2 | | 2/2008 | Patterson | |
| 7,373,445 | B2 | * | 5/2008 | Hellwig | ................ G06F 13/362 |
| | | | | | 710/243 |

(Continued)

OTHER PUBLICATIONS

Extended European Search Report, mailed Feb. 6, 2024, issued in the corresponding European Application No. 23315343.6, filed on Sep. 6, 2023.

*Primary Examiner* — Elias Mamo
(74) *Attorney, Agent, or Firm* — PERRY + CURRIER INC.

(57) ABSTRACT

The present invention relates to request and messaging technology and in particular to mechanisms of efficiently processing such requests. A computing device receives, from the client, a plurality of requests, the plurality of requests including multiple first requests and multiple second requests, each of the first and second requests comprising request data. The computing device assigns, based on the request data, a respective request processing priority to each of the first and second requests, processes the first requests based on the assigned processing priorities, while the second requests remain pending for processing and determines whether to adapt the priorities of the second requests based on the request data of the second requests and/or response data generated for the multiple first requests. If the determination is affirmative, the computing device adapts the priorities in accordance with the tech-nicely data and/or the response data generated and processes the second requests based on the adapted priorities.

17 Claims, 14 Drawing Sheets

(56)     References Cited

U.S. PATENT DOCUMENTS

|  |  |  |  |  |
|---|---|---|---|---|
| 7,478,179 | B2 * | 1/2009 | Moore | G06F 13/20 |
|  |  |  |  | 710/52 |
| 7,941,491 | B2 * | 5/2011 | Sood | H04L 51/212 |
|  |  |  |  | 709/206 |
| 8,023,408 | B2 | 9/2011 | Herrmann | |
| 8,290,995 | B1 * | 10/2012 | Hu | H04L 67/61 |
|  |  |  |  | 707/827 |
| 8,539,508 | B2 | 9/2013 | Bittles et al. | |
| 9,317,592 | B1 | 4/2016 | Bowman et al. | |
| 9,323,590 | B2 | 4/2016 | Terashita et al. | |
| 9,772,959 | B2 * | 9/2017 | Blaine | G06F 13/385 |
| 10,608,961 | B2 | 3/2020 | Kwong et al. | |
| 11,115,499 | B1 | 9/2021 | Knas et al. | |
| 2005/0223000 | A1 | 10/2005 | Davis et al. | |
| 2006/0109857 | A1 | 5/2006 | Herrman | |
| 2006/0171410 | A1 | 8/2006 | Jung et al. | |
| 2011/0246996 | A1 | 10/2011 | Tunning | |
| 2018/0270305 | A1 * | 9/2018 | Tignor | H04L 67/1008 |
| 2020/0104181 | A1 | 4/2020 | Pyati et al. | |
| 2020/0358784 | A1 | 11/2020 | Khaund | |

* cited by examiner

PROCESSING SEARCH REQUESTS

FIELD

The present disclosure generally relates to request and messaging technology and in particular to mechanisms of efficiently processing such requests.

BACKGROUND

Typically, requests or messages are processed according to fixed rules and principles, such as First In-First Out (FIFO), Last In-First Out (LIFO), or the processing is based on predefined weights associated with the incoming requests. Processing of incoming requests may also be executed based on associated deadlines, such as earliest deadlines being processed preferentially than later deadlines.

U.S. Pat. No. 6,658,485 B1 provides a scheduling system that allows a sender and a receiver to change priorities of queued messages. A technique is defined for providing a receiver with an advance notice of intended message priority, enabling the receiver to request a priority change before transmission begins. These techniques provide the flexibility to respond to changes in dynamic, volatile network environments, as well as changes in the wishes or requirements of a user. A ranking technique is defined, whereby requests to change priority may be accepted or denied through a ranking algorithm that resolves potential conflicts in desired transmission priority using proposals exchanged by the parties (e.g. during connection establishment).

US 2006/0171410 A1 provides a dynamic priority-based message transmitting apparatus including a priority storing block for recording priorities in a communication network environment having multitude nodes and recording the lowest priority among the priorities. A communication bus monitoring block monitors a communication bus and transmits its message when the communication bus is available. A message collision solving block solves message collision by monitoring message transmission when messages are transmitted from the other nodes simultaneously, comparing its priority and those of the other nodes and, as the comparison result, transmitting its message if its priority is higher than those of the other nodes while not transmitting its message if otherwise. A message filtering block executes filtering by judging whether or not its node has to process a certain message based on an identifier of the certain message, and a priority adjusting block adjusts its priority according to a predefined rule.

U.S. Pat. No. 8,023,408 B2 provides a message sequence regulator (MSR) system including a message parser, a message extraction repository, a rules repository, a message definition repository, an interface to a resource monitor for monitoring system resources by single resource monitoring agents, and a notification component for identifying sequence regulation operations which cannot be executed. The MSR system receives copies of messages loaded into or retrieved from queues by a queue manager as well as event messages from the resource monitor. The message extracts parts of the message using message structures defined in the rules repository and stores the extracted parts in the message extraction repository. If a defined condition is found to exist, the MSR system initiates calculation of an appropriate message sequence number or message priority level. The queue manager updates the message record without removing the message from the queue.

Attention is drawn to improving the operating mechanisms underlying the processing of requests according to priorities.

SUMMARY

The present disclosure aims at providing a request processing scheme which provides more processing flexibility and efficiency as in the prior art.

According to a first aspect, a method for processing requests from a requesting client is provided. A computing device receives, from the client, a plurality of requests, the plurality of requests including multiple first requests and multiple second requests, each of the first and second requests comprising request data. The computing device assigns, based on the request data, a respective request processing priority to each of the first and second requests, processes the first requests based on the assigned processing priorities, while the second requests remain pending for processing and determines whether to adapt the processing priorities of the second requests based on the request data of the second requests and/or response data generated for the multiple first requests. If the determination is affirmative, the computing device adapts the processing priorities in accordance with the request data and/or the response data generated and processes the second requests based on the adapted processing priorities.

According to a second aspect, a computing machine is provided acting as a computing device for processing requests from a requesting client, the computing device being arranged to execute the methods as described herein.

Finally, a computer program is presented that comprises instructions which, when the program is executed by a computer, cause the computer to carry out the methods described herein.

Further refinements are set forth by the dependent claims.

These and other objects, embodiments and advantages will become readily apparent to those skilled in the art from the following detailed description of the embodiments having reference to the attached figures, the invention not being limited to any particular embodiments.

BRIEF DESCRIPTION OF THE FIGURES

Aspects and examples of the present disclosure are described with reference to the following figures, in which.

DETAILED DESCRIPTION

Figure 1:
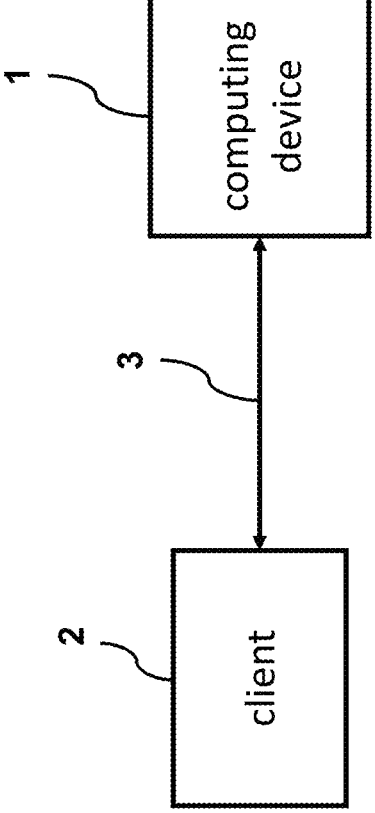
FIG. 1 illustrates a distributed computing system as described herein.

The present disclosure relates to the prioritization of processing requests. FIG. 1 shows a computing system comprising a computing device 1 and a client 2.

Computing device 1 and client 2 are located anywhere and are individual computing machines such as personal computers, mobile stations such as laptops or tablet computers, smartphones, and the like, as well as, in some embodiments, more powerful machines such as database application servers, distributed database systems respectively comprising multiple interconnected machines, data centers, etc. In some embodiments, the computing device 1 might be a similar machine as the client 2, while, in other embodiments, the computing device 1 is more powerful than the client 1. In one embodiment, computing device 1 and/or client 2 are data centers which may be worldwide distributed. The computing device 1 may act as a server towards client 2, processing and serving requests of client 2.

Figure 14:
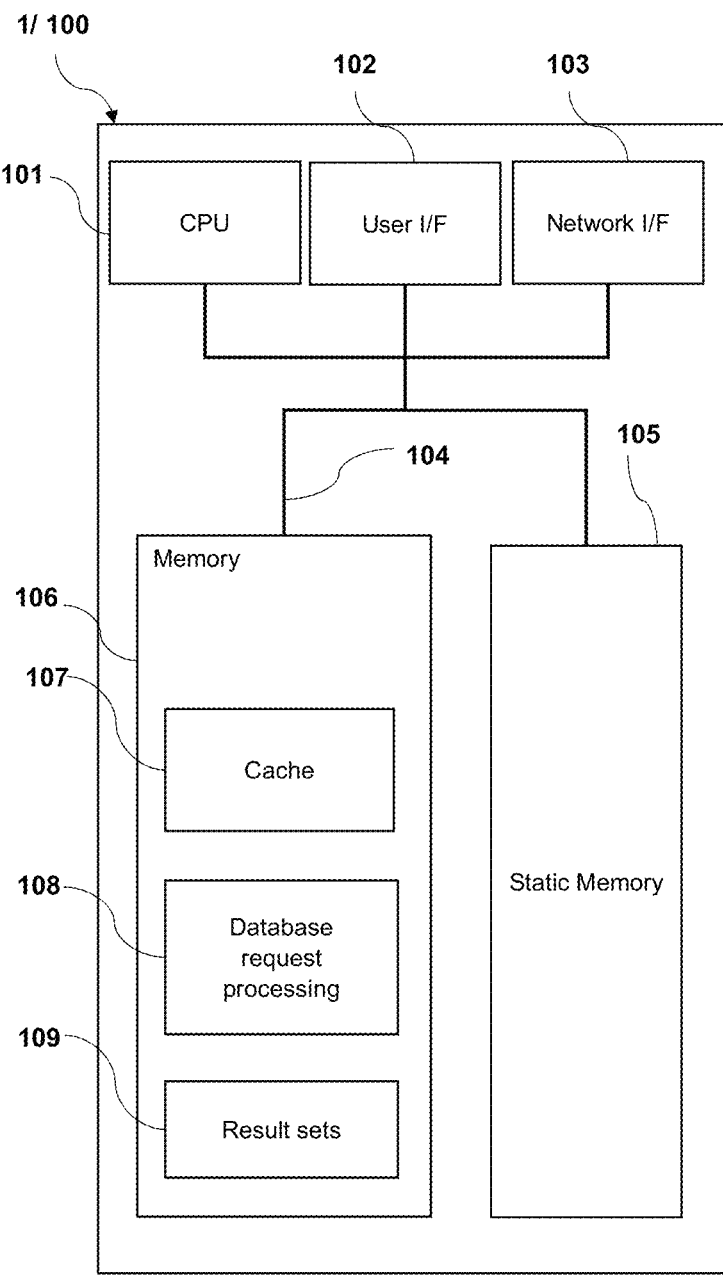
FIG. 14 is a diagrammatic representation of the internal components of a computing device as described herein.

Computing device 1 and/or client 2 may be constituted of several hardware machines depending on performance requirements. Computing device 1 and/or client 2 are embodied e.g. as stationary or mobile hardware machines comprising computing machines 100 as illustrated in FIG. 14 and/or as specialized systems such as embedded systems arranged for a particular technical purpose, and/or as software components running on a general or specialized computing hardware machine (such as a web server and web clients).

Computing device 1 and/or client 2 are interconnected by the communication interfaces 3. Each of the interfaces 3 utilizes a wired or wireless Local Area Network (LAN) or a wireline or wireless Metropolitan Area Network (MAN) or a wire-line or wireless Wide Area Network (WAN) such as the Internet or a combination of the aforementioned network technologies and are implemented by any suitable communication and network protocols.

Requests, which are requested from client 2 over the communication interface 3 are received at the computing device 1. Computing device 1 may implement standardized communication protocols across the layers of the OSI reference model. Amongst others, the computing device 1 may employ initial processing mechanisms such as error recognitions and corrections, packet assembly, as well as determination whether a request has been received. Invalid messages may be discarded by computing device 1 for reasons of security and performance.

The requests described herein may relate to any use case in the field of database, messaging and/or networking technology and others. Generally, requests may be given by any data structure received at the computing device 1 by one or more network protocols and may cause the computing device 1 to process the request. Typically, a request causes the computing device 1 to react towards the requestor with a response, but any types of request processing is encompassed herein, including request processing without any responses. Typically use cases of requests are search platforms, messaging platforms, database systems, server systems, client/server-based request-response protocols.

Figure 2:
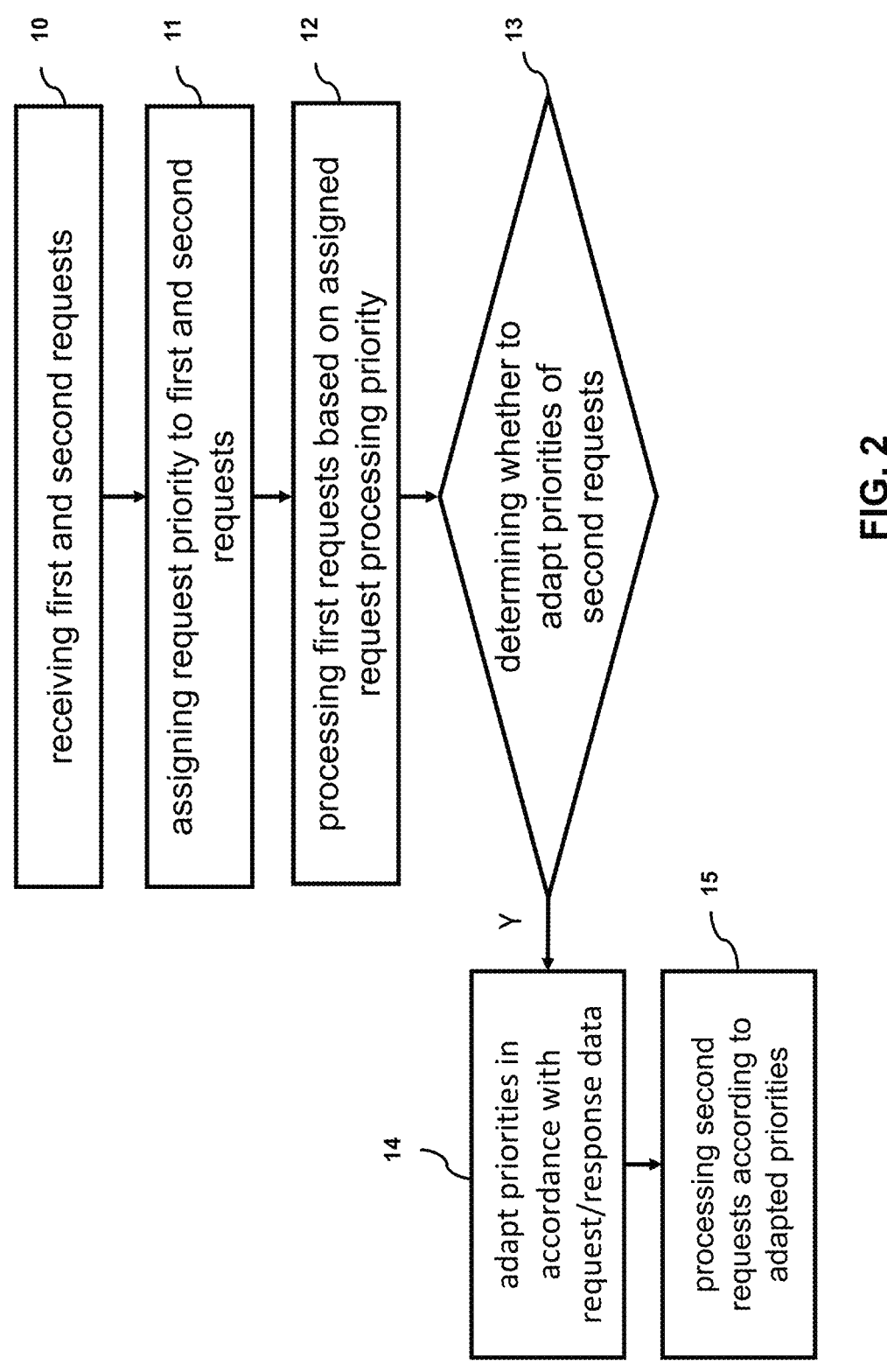
FIG. 2 shows a flow chart for the processing of requests from a requesting client.

FIG. 2 shows a flow chart for processing requests by a computing device 1 from a requesting client 2 according to some embodiments. In an activity 10, computing device 1 receives from the client 2, a plurality of requests, the plurality of requests including multiple first requests and multiple second requests, each of the first and second requests comprising request data. Computing device 1 assigns, in an activity 11, based on the request data, a respective request processing priority to each of the first and second requests and processes, in an activity 12, the first requests based on the assigned processing priorities, while the second quests remain pending for processing. In an activity 13, computing device 1 determines whether to adapt the processing priorities of the second requests based on the request data of the second requests and/or response data generated for the first requests. If the determination 13 is affirmative, computing device 1 adapts, in an activity 14, the processing priorities in accordance with the request data and/or the response data generated. In an activity 15, computing device 1 processes the second requests based on the adapted processing priorities.

In embodiments, processing priorities may be indicated by a numerical scale, such as a scale ranging from 0 to 7, thereby using numbers which can be represented by a 3-bit-binary number. A number of 0 may indicate the lowest possible priority, whereas a number of 7 the highest possible priority. As an example, when employing a First-In First-Out (FIFO) mechanism for processing incoming requests, request #1 originating from a Japan-based client, of the multiple first requests getting received at the computing device 1 as first request within a time period T gets assigned the priority indication number 7, indicating that this request is processed first. Correspondingly, request #2, originating from a US-based client, getting received as the second request within time period T gets assigned the priority indication number 6, indicating that request #2 is processed after request #1. Finally, request #8, also originating from a US-based client, arriving getting received as last request within time period T is assigned the priority indication number 0, indicating that request #8 is the last request to be processed by computing device 1. In a similar way, a FIFO mechanism together with a scale ranging from 0 to 7 may be applied to requests directed to a certain client, such a clients located in the USA. As an example, a request #1 received at computing device 1 and directed to a client in the US may receive a priority indication number of 7. A request #2, arriving at computing device 1 after request #1 within the time period T and directed to a French client, may receive the priority indication number 6, and so on.

In an example, the requests of the multiple first requests are determined by the priority indication number. Request having priority indication numbers of e. g. 7, 6, and 5 may be grouped into the multiple first requests, whereas requests having a priority indication number of 4, 3, 2 or 1 are grouped into the second multiple requests. In a further example, the multiple first requests may comprise a defined number of requests, such as e. g. the first 100 requests arriving within time period T, with the multiple second requests comprising the remaining requests of the plurality of requests. This defined number may be adapted during various processing cycles, e. g. during time period T, the adaptation e. g. being based on the overall number of the plurality of requests. Also, in a further example, those requests arriving e. g. in the first 15 s of time period T may be grouped into the multiple first requests, whereas requests arriving in the remaining time of time period T are grouped into second multiple requests.

The processing of the requests as shown in FIG. 2 may be executed in an iterative manner. As an example, sequence as shown in FIG. 2 may be applied on the requests of the multiple second requests.

By the sequence as described and shown in FIG. 2, a particular way to prioritize the processing of a number of requests is provided. Instead of processing requests according to defined rules, such as FIFO, LIFO or set deadlines, processing future incoming requests or requests already received, but not yet processed is controlled (prioritized) based on dynamically adaptable processing priorities. The processing priorities depend on request data, i.e. data included in the received request. Depending on the particular use case (e.g. messaging system, transaction system, search system, database system, computing centers etc.) including the utilized request protocol(s), the requests include different types of request data. The present mechanisms to maintain dynamically adaptable processing priorities for processing the requests may utilize any request data which provides significant information that can be used for determining whether processing a certain request is to be prioritized over processing another request. Optionally, the processing priorities depend on characteristics of the requests, such as times of their reception, request reception bursts (e.g. a given number of requests is received within a certain time interval), a reception channel of receiving requests, etc. The characteristics may also be related to the computing device 1 and/or the client 2 and/or their characterizing data (e.g. geographical location, touchpoint, workload etc.) and/or the communication system and its characterizing data (e.g. time stamp, protocol etc.). Therefore, the sequence of FIG. 2 provides a way to prioritize the processing of a number of requests independent of the underlying computing technology, such as the messaging technology.

This enables that e. g. incoming requests (implicitly or explicitly) indicating an urgent need for receiving a response will be processed before those incoming requests whose responses can be delayed. Generally, the present mechanisms allow for a more dynamic prioritization of request processing based on request data included in the requests to be processed.

Figure 3:
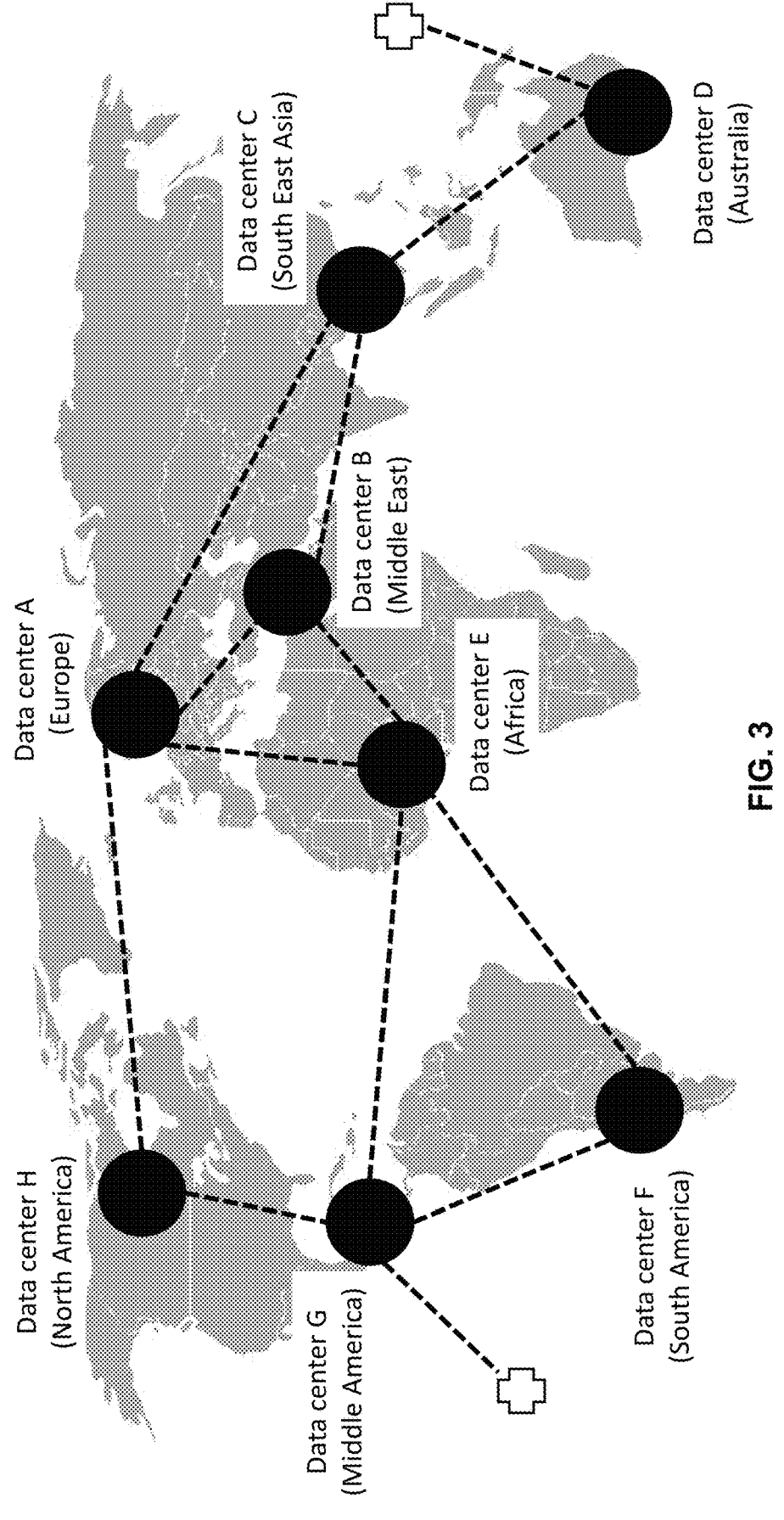
FIG. 3 is schematic depiction of a worldwide distributed network of data centers, being an exemplar use case for the mechanisms described herein.

FIG. 3 shows a non-limiting use case of the present methodologies. A worldwide network includes globally distributed data centers, such as data center A located in Europe, data center C located in South East Asia, data center H located in North America etc. At a certain time, such during a nighttime in North America and a corresponding daytime in East Asia, data center H processes queries from clients residing e. g. in the USA and also from clients residing in Japan. At the same time, data center C located in East Asia, also processes request from clients residing in Japan and the USA. Also, each data center may process requests related to a certain geographical region, e. g. data center H located in North America may preferentially process requests indicated to be processed at data center H rather than being transmitted by data center H to other data centers. Data center H may also process preferentially requests whose response data gets sent to clients residing in the USA. Geographical information, such as the location of the requesting clients, such as USA and Japan, may be indicated e. g. in the request data associated with the request, as explained in more detail below. Also, the recipient of the request, such as data center H residing in the USA may be indicated in the geographical information.

When daytime starts in North America, the number of requests from clients located in the USA may start to rise sharply. Furthermore, these requests require processing on a short time scale, as indicated e. g. in their request data related to a deadline. Therefore, data center H, which may be identified with computing device 1 (FIG. 1), rearranges the processing sequence for the incoming requests, departing from a mechanism such as FIFO to an order, in which incoming requests from US-located clients will be processed with a preference over requests originating from Japanese clients arriving at data center H at a time during which it is night in Japan. Therefore, the processing priorities for the processing of incoming requests at data center H is adapted.

At data center H, multiple first requests of a plurality of incoming requests are received (activity 10) and processed (activity 12) according to a FIFO mechanism, with corresponding processing priorities assigned (activity 11) to the multiple first requests, such as processing priorities taken from the numerical scale ranging from 0 to 7, as described earlier within this disclosure. Response data is generated for the multiple first requests. Also, at data center H, multiple second requests of said plurality are received (activity 10) and are pending and are originally be intended also to be processed according to the FIFO mechanism. Data center H determines (activity 13) whether to adapt the FIFO related processing priorities of the second requests by analysing the content of the request data of the second requests and/or the response data generated for the multiple first requests. The determination yields an affirmative result, since data center H determines that those requests of the multiple second requests originating from US-based clients now come in high numbers and require short-time processing. Data center H adapts (activity 14) the processing priorities so that at data center H, the multiple second requests and also subsequent incoming requests are not processed according to the FIFO mechanism anymore, but are processed with a higher priority when their client/originator is located in the USA. Requests originating from a client 2 based in the USA are therefore assigned a priority of 7, whereas the remaining non-US originating requests are assigned processing priorities ranging from 0 to 6, and may be further processed according to a FIFO mechanism (e.g. FIFO among requests with the same priority). As a consequence, the multiple second requests of the plurality of incoming requests from a US-based client 2 are processed in a prioritized manner (activity 15). Referring to the example cited above, request #2 and request #8, both originating from US-based clients and having been assigned originally the priority indication numbers 6 and 0, respectively, are now re-assigned with the priority indication number 7, indicating the highest priority. Request #1, originating from a Japan-based client, and having been assigned originally the priority indication number 7, get reassigned the priority indication number 6. In a similar manner, the FIFO related processing priorities may be adapted on the geographical information of the receiving data center. To cite an example, requests sent to data center H located in the USA and to be processed at data center H may be assigned the highest priority indication number 7, whereas requests directed to other data centers, such as data center G and being transmitted over data center H are transmitted by data center H with a priority indication number 6, i. e. after the requests with priority number 7 have been processed by data center H.

A corresponding adaptation of the processing priorities may also be performed at data center C. At the same where data center H performs a preferential processing of US-originating request, data center C may also prioritize the processing of US-originating requests, in order to relieve workload from data center H. Alternatively, data center C may prioritize the processing of requests originating from Japan, through adapting the corresponding processing priorities in the same way data center H has executed for the US-originating requests.

Figure 4:
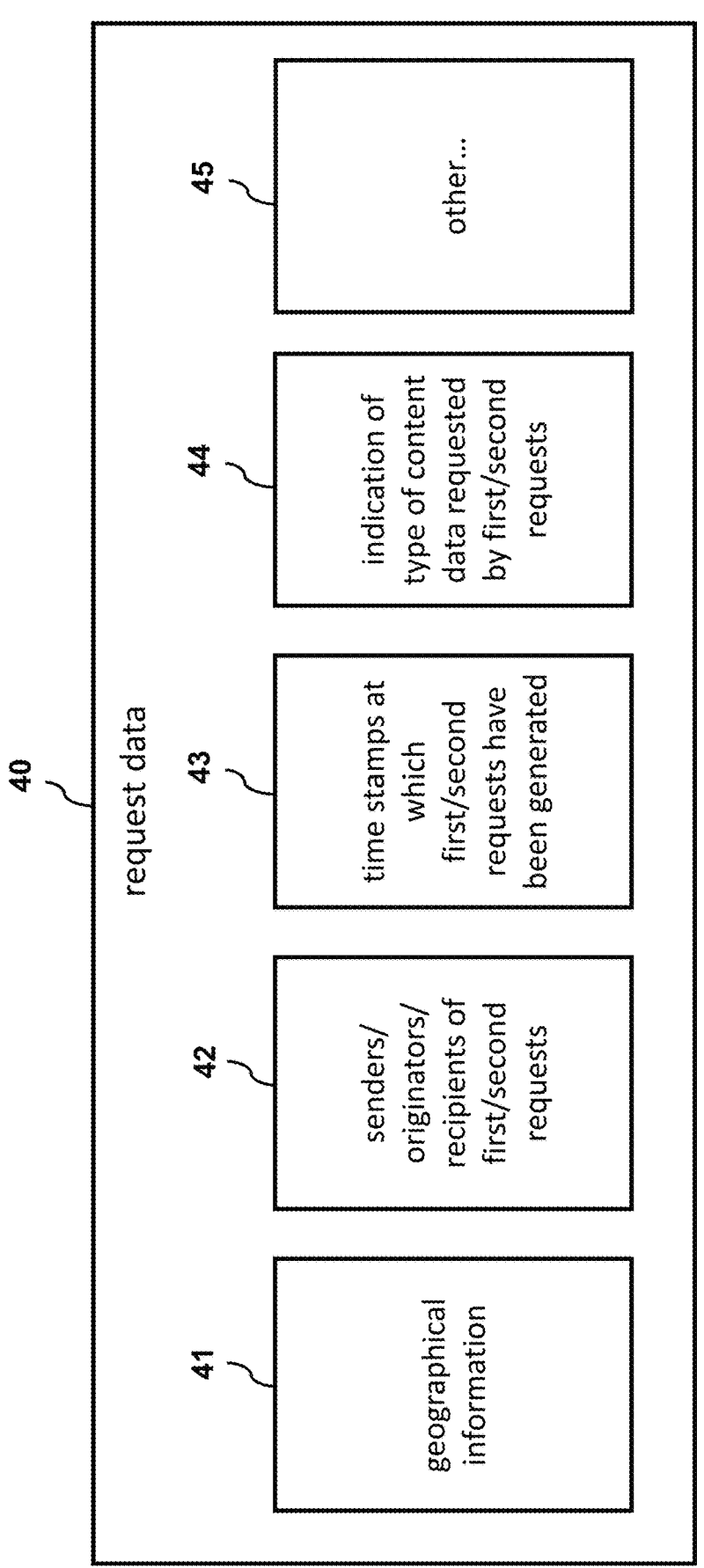
FIG. 4. illustrates request data as described herein.

In some embodiments, and as shown in FIG. 4, the request data 40 comprise senders/originators and/or recipients 42 of the first and the second requests; timestamps 43 indicating when the first and the second requests have been generated, an indication 44 of the type of content data being requested by the first and the second requests to be processed, an indication 41 of a geographical region. Generally, request data included in a request as used herein encompasses any data eligible for prioritization depending on the particular use case, in particular functional data included in a request or message header, but may also be included in a payload part of the request or message.

Referring to the example of FIG. 3, the request data 40 may comprise, as a geographical indication 41, the destination data center to which requested data transmissions are to be directed and/or at which the request is to be processed, such as data center H being located in North America, e. g. in the USA. Priorities may be adapted e.g. on the destination data center, such as data transmissions being generated in the USA and/or being directed to data centers in the USA during daytime, such as the 31 Dec. 2022 at 12:00 a.m., may be prioritized over all other data transmission requests directed to data centers outside the USA. The request data of the multiple incoming requests may comprise as sender 42 of the request e. g. a requesting client in the USA or Japan. In addition, a more specific location of the requesting client may be indicated, such as Los Angeles, California, USA or Tokyo, Japan. Request data may comprise as timestamps 43 of the generation of the request data such as e. g. the date of 31 Dec. 2022 with a time of 01:30:50. Request data 40 may comprise as indication 44 of the type of requested content e. g. data relating to transmission capabilities of the data connections between data centers C and H. Request data may comprise other data 45 to be used for adapting processing priorities. In some embodiments, the senders 42 and/or the originators 42 and/or the recipient 42 are be indicated by a network address such as an IP-address and/or by a MAC-address and/or a hostname and/or a telephone number. In some embodiments, the senders 42 and/or the originators 42 and/or the recipients 42 are indicated by geolocation information. In some further embodiments, any suitable unique identifier (UID) is used for indicating the senders 42 and/or the originators 42 and/or the recipient 42.

Figure 5:
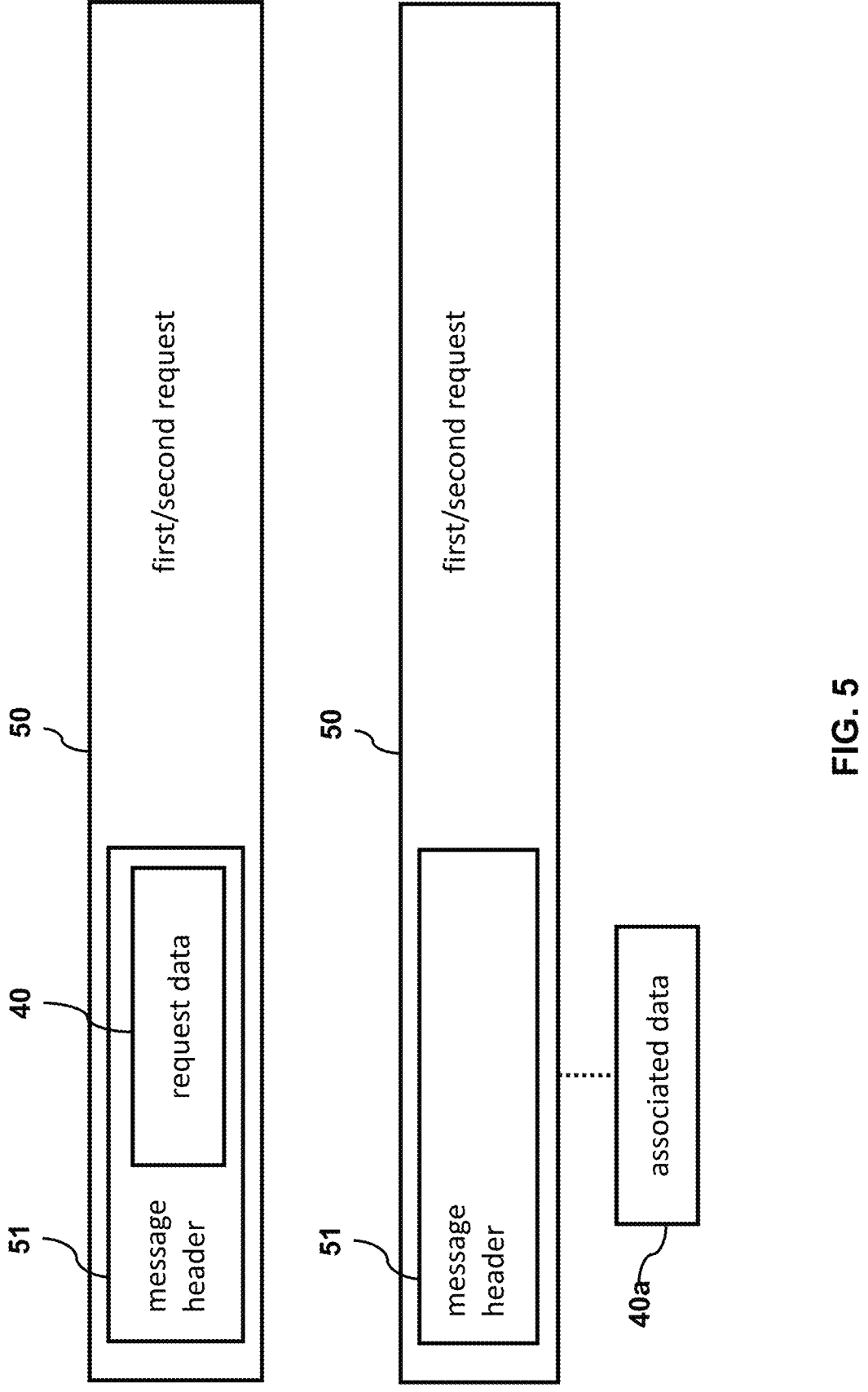
FIG. 5 depicts a format of a request as described herein.

In some embodiments and as shown in FIG. 5, request data 40 is included in a message header 51 and/or in one or more data fields of the first and/or second requests 50 and/or, as associated data 40a, in a separate data structure associated with the first and second requests 50. In some embodiments, the first and second requests may be transmitted from the client 2 to the computing device 1 over the internet using e. g. the TCP/IP protocol and the request data 40 is included in the corresponding IP-header of the first and/or second request. In some embodiments, the request data is included in the payload data of the first and/or second request. In some embodiments, the associated data 40a is included in a web cookie associated with the first and/or second requests 50. A web cookie may be used e. g. in the case the computing device 1 comprises of a web browser having to retrieve resources (images, video, description) upon refreshing of a page.

Figure 6:
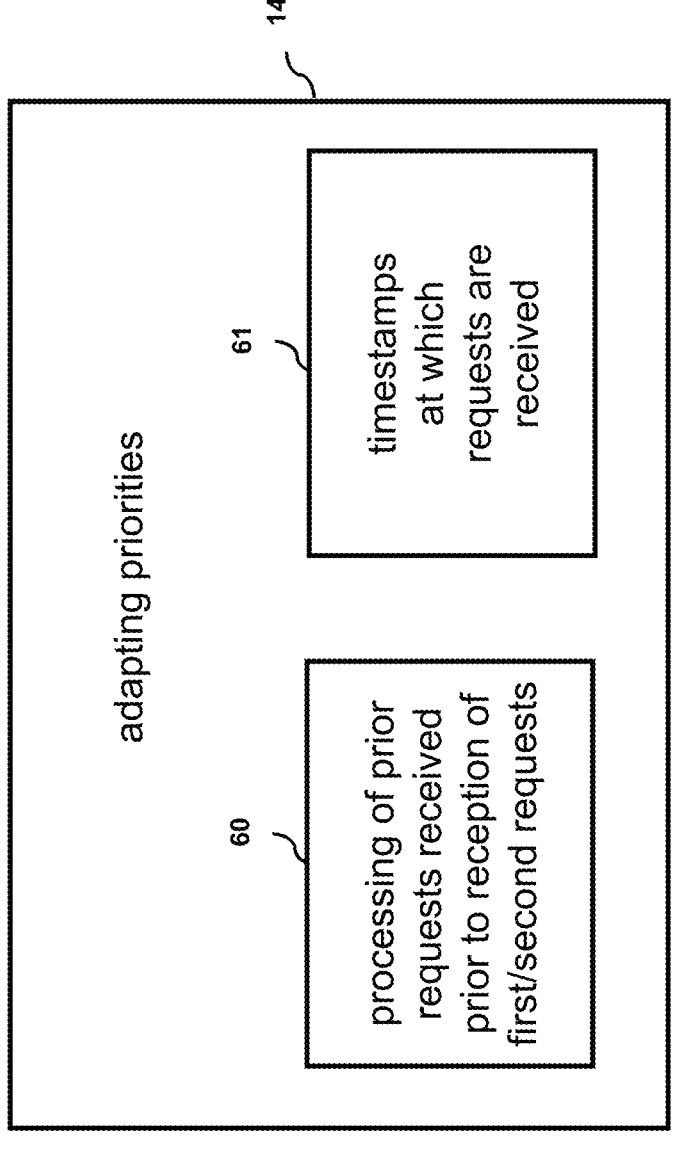
FIG. 6 shows mechanisms for adapting processing priorities as described herein.

In some embodiments and as shown in FIG. 6, adapting the processing priorities is based on the processing 60 of prior requests received at the computing device 1 prior to the reception of the first and the second requests and/or a timestamps 61, at which the first and the second requests are received at the computing device 1. Referring to the example as shown in FIG. 3, prior requests may have been already received and processed at data center H located in North America before the reception of the multiple first requests of a plurality of incoming requests. From the processing 60 of these prior requests, it has already been determined by data center H that during daytime, e. g. between 06:00 a.m. and 06:00 p.m. (US)-Eastern Time in the USA, incoming requests origination from clients located in the USA are processed preferentially and the processing priorities for processing incoming requests at data center H are adapted accordingly. Adapting the processing priorities may further be based on timestamps 61, indicating the reception of these prior requests at data center H, i. e. the date of 31 Dec. 2022 with a time of 01:30:56. As a further example, requests to be processed at data center H rather than to be transmitted to other data centers get, between 06:00 a.m. and 06:00 p.m. (US)-Eastern Time in the USA, preferentially processed by data center H over those requests to be transmitted to other data centers, such as data center G and F.

Figure 7:
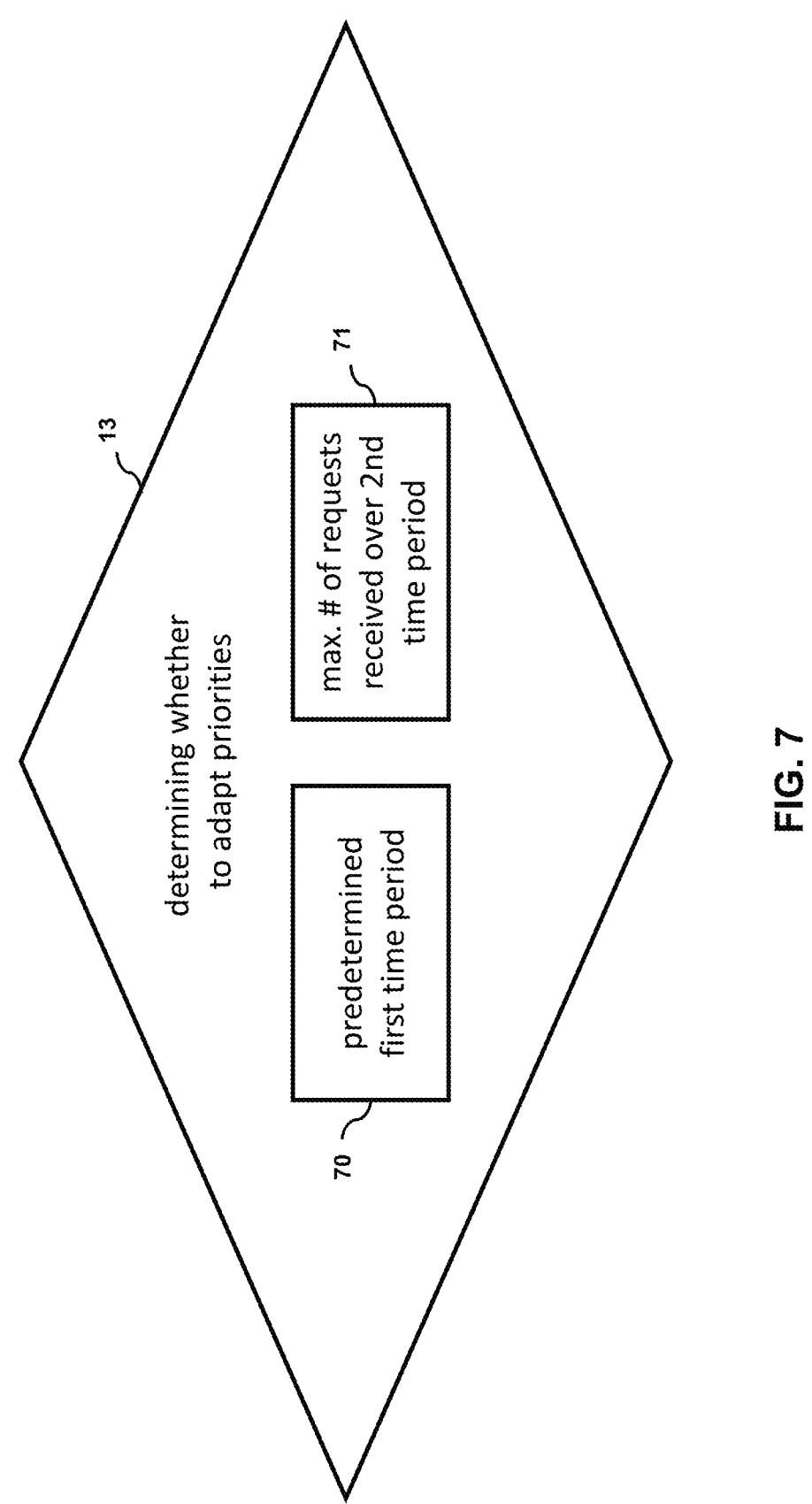
FIG. 7 shows mechanisms for determining whether to adapt processing priorities as described herein.

In embodiments and as shown in FIG. 7, the determination 13 whether to adapt the processing priorities may be triggered by a predefined first time period 70 and/or 71 a maximum number of the further requests received at the computing device 1 over a predefined second time period. Referring again to the example as shown in FIG. 3, data center H may determine 13 e. g. every 30 minutes per hour whether to adapt the processing priorities for the processing of the incoming requests. In some further embodiments, other time periods or time points for triggering the adaptation may be defined such as, in the case of data center H, e. g. the time points of 06:00 a.m. and 06:00 p.m. US-Eastern Time (EST) in the USA. In some embodiments, and referring again to data center H of FIG. 3, the number of incoming requests originating from US-based clients or to be processed at data center H (rather than to be transmitted to other data centers) may trigger an activity to determine 13 whether to adapt the processing priorities. If, as an example, the number of incoming requests from US-based requests within 60 minutes exceeds a threshold of 100.000, a determination 13 whether to adapt the processing priorities at data center H is triggered. A threshold-based triggering may occur at any point in time. In some embodiments, different mechanisms or a combination of different mechanisms for triggering the adaptation of the processing priorities may be executed e. g. at data center H.

Figure 8:
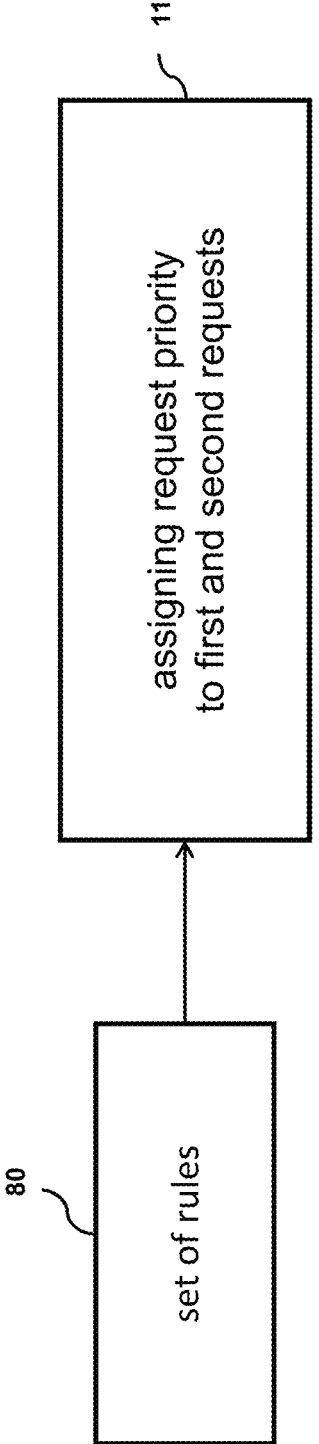
FIG. 8 illustrated the application of a set of rules for the assignment of processing priorities for processing incoming requests as described herein.

In some embodiments, and as shown in FIG. 8, the processing priorities are assigned 11 by using a set of rules 80 maintained at the computing device 1. In some further embodiments, the set of rules may be related to the type of requests, the type being e. g. indicated by the type of the requesting clients. Referring again to the example as shown in FIG. 3 of the disclosure, a set of rules 80 may be maintained at data center H comprising e. g. one or more thresholds relating to incoming requests per time unit, which are used for the assignment 11 of request processing priorities. Different threshold may be defined e. g. for requesting clients originating in the USA and Japan or for requests to be processed at data center H (rather than be transmitted to other data centers). The set of rules 80 may also define time periods for applying said thresholds, such as applying the aforementioned threshold of 100.000 requests per hour for US-based requesting clients during 06:00 a.m. and 06:00 p.m. EST and a corresponding threshold for requesting clients based in Japan during the remaining EST-hours.

Figure 9:
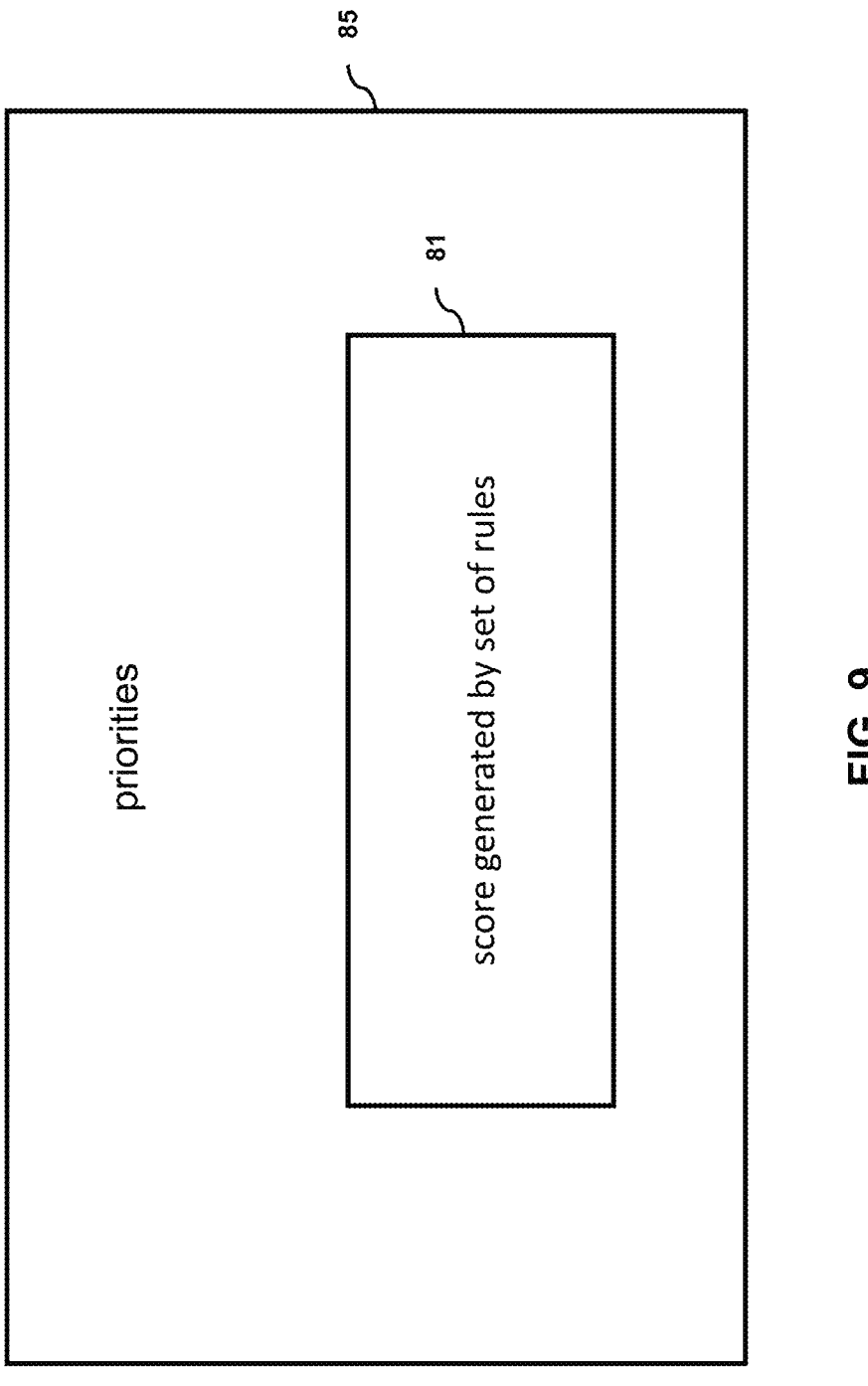
FIG. 9 depicts a score generated by a set-of-rules as comprised by processing priorities.

In some embodiments and as shown in FIG. 9, the processing priorities 85 comprise a score 81 generated by the set of rules. A score 81 may comprise all classification systems suitable for defining a hierarchical system. In some embodiments, the set of rules 81 may generate a static score which is applied for all conditions under which incoming requests are received at the computing device 1. Referring again to the example shown in FIG. 3, the score range of 0 to 7 may be applied to all data enters shown in FIG. 3, regardless of their geographical position. Therefore, within this example, the scale ranging from 0 to 7 would be applied to data centers A, B, C, D, E, F and H. In some embodiments, the set of rules may generate a dynamic score, which may vary according to changing conditions under which incoming requests are received at the data centers of FIG. 3. As an example, at data center H, the set of rules may generate a score of 0 to 7 for requests received during nighttime between 06:00 p.m. EST and 06.00 a.m. EST and a score range on 0 to 15 for requests received during daytime between 06:00 a.m. EST and 06.00 p.m. EST, enabling the processing of incoming requests with a finer hierarchical granularity. Generation of processing priorities 85 by a set of rules enable a flexible adaptation of the processing order of incoming requests to varying conditions, such as daytime or nighttime or the number or type of incoming requests.

Figure 10:
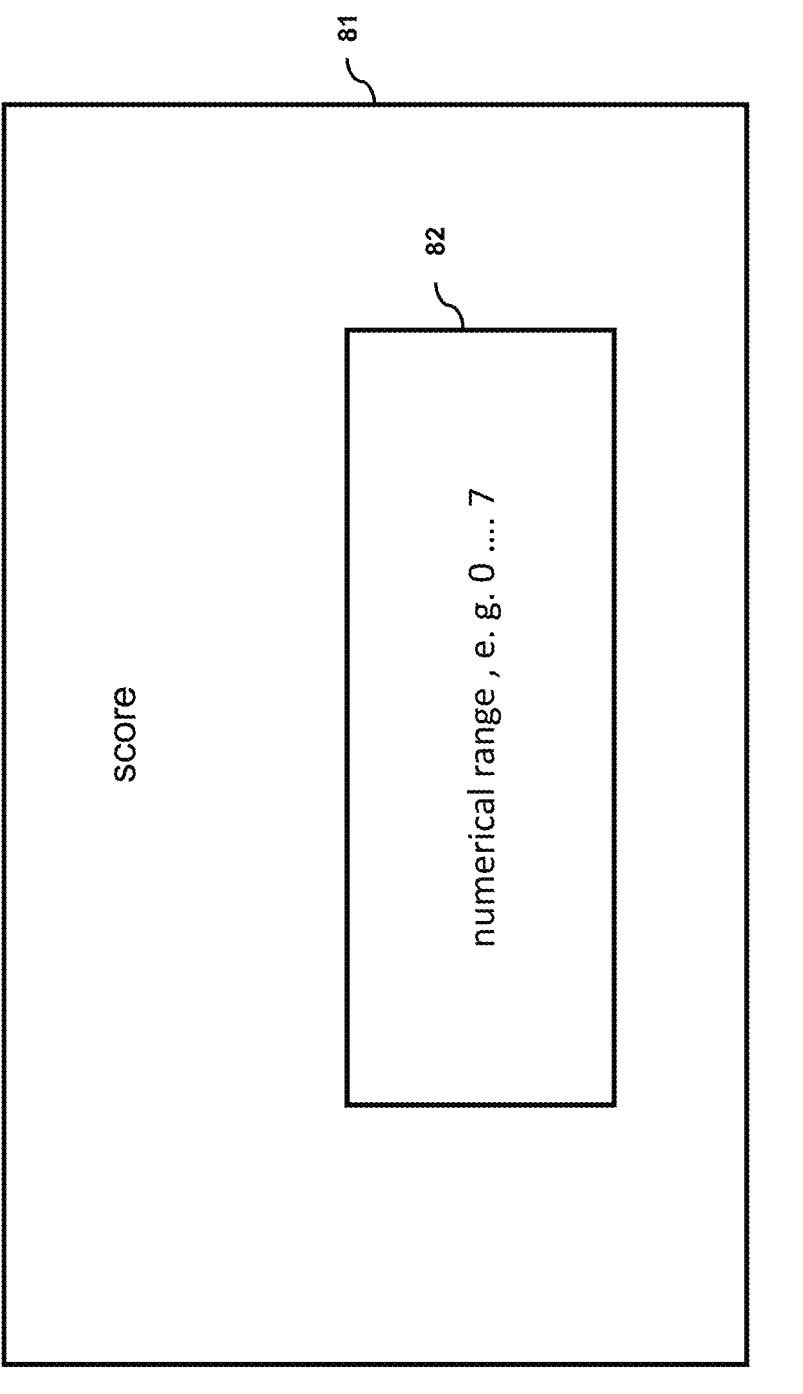
FIG. 10 depicts a numerical range as comprised by the score.

In some embodiments and as shown in FIG. 10, the score 81 comprises a numerical range 82. As already described with reference to the example shown in FIG. 10, the numerical range may be spanned up by a 3-bit-binary number, ranging e. g. from 0 to 7. In some other embodiments, and as also described earlier within this disclosure, a 4-bit-binary number ranging from 0 to 15 may be applied. In some embodiments, any other numerical range may be comprised by the score. Numerical ranges enable the definition of a hierarchical set of processing priorities for the processing of incoming requests at the computing device 1, such as one of the data centers A to H of FIG. 3.

Various implementations to assign and adapt processing priorities to received requests are envisaged. For example, the priority in form of a score (as described above) may be included in a data field of a request so that the request is self-contained in the sense that the request also carries its priority. In other implementations, the processing priorities are held in a control data structure in a memory of the computing device 1, so that any request is associated with a priority. In some implementations, the priority of a request is given by a processing queue. For example, in a system with defined priority of a range between 0 and 7, eight processing queues may be established, one processing queue per priority score. The priority of a request is then given by the queue in which the requests is inserted for processing.

The particular implementation to adapt a priority then depends on the implementation of the processing priorities. For example, in a system with a queue-based implementation, i.e. one processing queue per priority, a priority of a request may be adapted by relocating the request from its current processing queue to the processing queue corresponding to the adapted priority. In other implementations, the priority score included in or assigned to the request may be updated to reflect the adapted priority.

Processing the requests by the computing device 1 is based on the processing priorities of the requests. That is, requests with a higher priority are generally processed in a prioritized way (e.g. earlier in time) than requests with lower priority. However, additional factors may also influence the processing sequence of the requests, and the priority may not be the only relevant factor in a practical system. For example, the requests may also include an urgency flag, or the size of a request may be a relevant factor, e.g. to determine the processing sequence among requests with equal priority. As mentioned above, also further processing logic such as FIFO or LIFO may be applied in addition.

Figure 11:
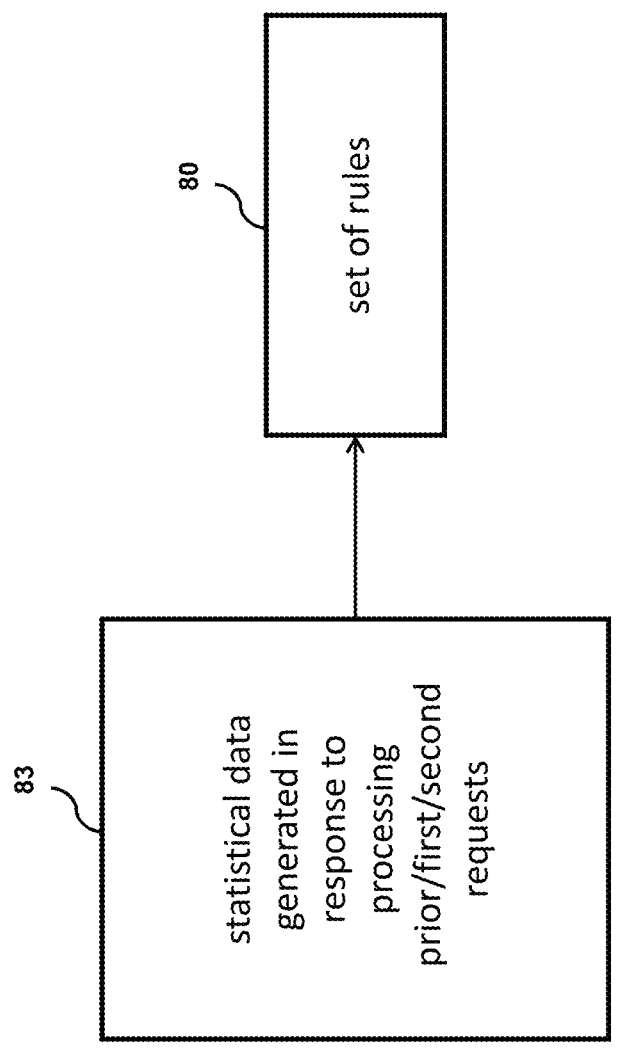
FIG. 11 illustrates the adaptation of a set-of-rules based on statistical data.

In some embodiments and as shown in FIG. 11, the set of rules 80 is adapted based on statistical data 83 generated in response to the processing of the first and the second requests and to the processing of prior requests received prior to the reception of the first and the second requests. Referring to the example of FIG. 3, statistical data generated in response to prior requests show that the number of incoming requests originating from US-based client received at data center H has increased over the past five years by a factor of 10. As a consequence, the computational resources of data center H for processing requests during daytime are not sufficient anymore. Therefore, in order to relieve some computational load from data center H, the set-of-rules of data center A located in Europe are adapted in such a way that between 06:00 a.m. EST and 06:00 p.m. EST requests, which are transferred from data center H to data center A, are processed in a prioritized manner. The set of rules 80, which assign the processing priorities 85, are there accordingly adapted. Adaptation of the set of rules 80 based on statistical data 83 enables the adaptation of the processing priorities 85 according to various conditions and therefore the efficient processing of incoming requests according to such various conditions.

In some embodiments, statistical data 83 show that during the last two years in the morning time at the various data centers, the requests for transmitting data between the data centers increase. As an example, at data center D located in Australia, between 08:00 a.m. and 11:00 a.m. Australian Eastern Standard Time (AEST), the requests for transmission of data into the USA and therefore to data center H increases. The set of rules 80 assigning the processing priorities for the processing of requests at data center D is adapted in order to assign a priority of 7 to incoming requests for data transmission into the USA between 08:00 and 11:00 AEST, enabling the prioritized processing of such requests at data center D.

In some embodiments, the statistical data 83 reflects the type of content having been processed preferentially in corresponding requests during the past, such as e. g. content relating to the activities of globally operating organizations and corporations, and which further may be prioritized once corresponding future requests arrive at the various data centers.

Figure 12:
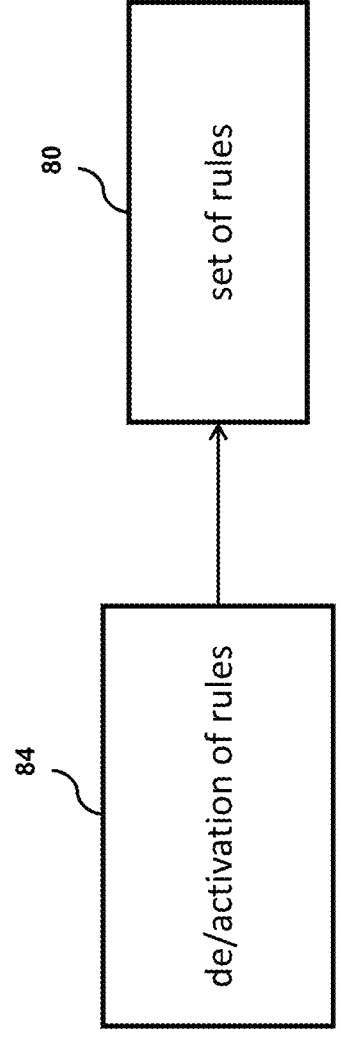
FIG. 12 shows the de/activation of rules of a set-of-rules.

In some embodiments, and as shown in FIG. 12, adapting the set of rules 80 comprises the activation and/or deactivation 84 of one or more rules of the set of rules 80. Citing the example of data center D located in Australia, the statistical data 83 show, that during the last three months the requests for transmission of data into the USA has decreased e. g. by 80% with respect to the corresponding months of the year before. The set of rules 83 for data center D gets therefore adapted in such a way that the rule relating to the preferential processing of requests for data transmissions into the USA arriving at data center D between 08:00 and 11:00 AEST (assigning a priority of 7) is deactivated 84 until statistical data 83 again show that this rule has to be activated again.

Figure 13:
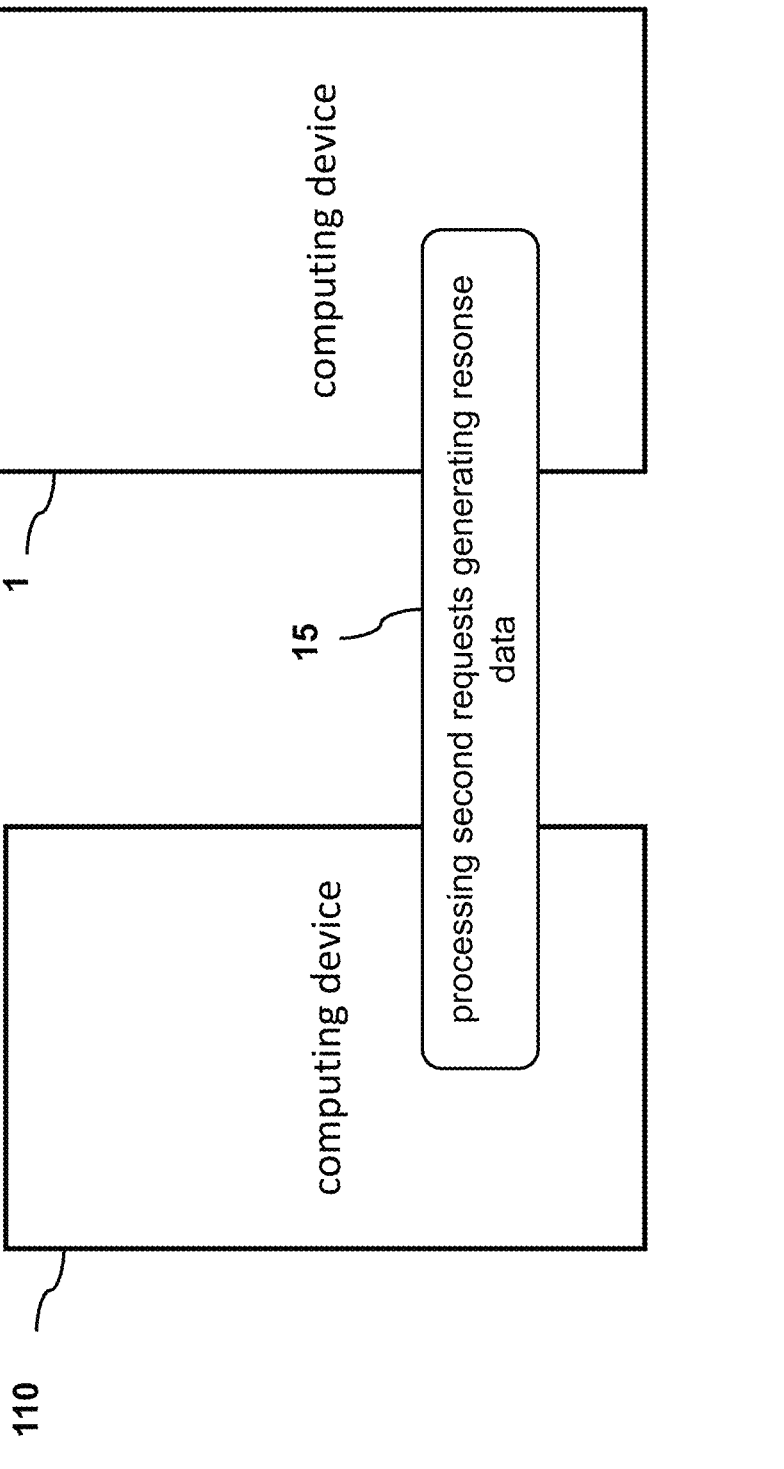
FIG. 13 depicts the processing of second requests by more than one computing device.

In some embodiments and as illustrated in FIG. 13, processing 15 the second requests comprises a selection of at least one of one or more further computing devices 110 for processing a subset of the second requests, the one or more further computing devices 110 forming a distributed network with the computing device 1. Referring to the example as described with regard to FIG. 11, data center A is selected as further computing device 110 for processing, between 06:00 a.m. EST and 06:00 p.m. EST, requests originating from US-based received at data center H. In addition, also data center B located in the Middle East may also be selected as further computing device 110 for processing of such requests.

The flow chart as shown in FIG. 2 may also be applied for purchasing products and services, such as requests for travel offers and flight connections. For example, during daytime in North America, the requests for flight connections originating from US-based clients 2 requesting domestic US flight connections, being received at data center H rise sharply. As already explained in the preceding sections of the present disclosure, the processing priorities for data center H get adapted 14 accordingly in order to process these requests for US domestic flight connections with a priority indication number 7, whereas the requests from Japan-based requests relating to non-US domestic flight connections, being far less numerous during North American daytime, will be processed with a priority indication number of 6 at the maximum. In a similar way, requests to update data relating e. g. to fares, prices and restrictions concerning US domestic flights, which also may be received at data center H, will also be processed in a prioritized way over requests to update data e. g. related to Japanese fare and restrictions.

On the other hand, during nighttime in North America, requests for non-US domestic flight connections originating e. g. from Japan-, China- or India-based clients 2 rise sharply while the numbers of corresponding requests from US-based clients 2 witness a significant decline. The processing priorities for data center H get accordingly adapted in order to process, during nighttime in North America, the requests for flight connections originating from Japan-, China- and India-based requests with a priority indication number of 7.

FIG. 14 is a diagrammatic representation of the internal components of a computing machine 100 implementing the functionality of computing device 1, client 2 and further computing device 110. The computing machine 100 includes a set of instructions to cause the computing machine 100 to perform any of the methodologies discussed herein when executed by the computing machine 100. The computing machine 100 includes at least one processor 101, a main memory 106 and a network interface device 103 which communicate with each other via a bus 104. Optionally, the computing machine 100 may further include a static memory 105 and a disk-drive unit. A display, an alphanumeric input device and a cursor control device may be provided as examples of user interface 102. The network interface device 103 connects the computing machine 100 implementing the computing device 1 with the client 2. Furthermore, network interface device 103 also connects the computing machine 100 implementing the computing device 1 with the further computing device 110.

Computing machine 100 includes a memory 106 such as main memory, random access memory (RAM) and/or any further volatile memory. The memory 106 may store temporary data and program data 107 to facilitate the functionality of the computing device 1, including program data to realize the receiving 10, from the client 2, of a plurality of requests, the plurality of requests including multiple first requests and multiple second requests, each of the first and second requests comprising request data.

In addition, the memory 106 may store temporary data and program data 107 to realize, by the computing platform 1, the assigning 11, based on the request data, a respective request processing priority to each of the first and second requests, the processing 2 of the first requests based on the assigned processing priorities, while the second requests remain pending for processing, the determining 13 whether to adapt the processing priorities of the second requests based on the request data of the second requests and/or response data generated for the multiple first requests, and if the determination is affirmative, adapting 14 the processing priorities in accordance with the request data and/or the response data generated and the processing 15 of the second requests based on the adapted processing priorities. The memory 106 may also store temporary data such as request and response data 109.

A set of computer-executable instructions embodying any one, or all, of the methodologies described herein, resides completely, or at least partially, in or on a machine-readable storage medium, e.g., in the static memory 105 or, when loaded and being executed, in the main memory 106. For example, the instructions may include software processes implementing the request processing functionality of the computing platform 1. The instructions may further be transmitted or received as a propagated signal via the Internet through the network interface device 103 or via the user interface 102. Communication within computing machine 100 is performed via a bus 104. Basic operation of the computing machine 100 is controlled by an operating system which is also located in the memory 106, the at least one processor 101 and/or the static memory 105.

In general, the routines executed to implement the embodiments, whether implemented as part of an operating system or a specific application, component, program, object, module or sequence of instructions, or even a subset thereof, may be referred to herein as "computer program code" or simply "program code". Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

In certain alternative embodiments, the functions and/or acts specified in the flowcharts, sequence diagrams, and/or block diagrams may be re-ordered, processed serially, and/or processed concurrently. Moreover, any of the flowcharts, sequence diagrams, and/or block diagrams may include more or fewer blocks than those illustrated consistent with embodiments and examples.

The terminology used herein is for the purpose of describing particular embodiments and examples, and is not intended to be limiting. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While a description of various embodiments has illustrated all of the inventions and while these embodiments have been described in considerable detail, it is not the intention to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details.

The invention claimed is:

1. A method for processing requests from at least one requesting client, the method comprising, at a computing device forming part of a distributed network of data centers:

receiving from the at least one client, at a data center, of the distributed network of data centers, a plurality of requests, the plurality of requests including multiple first requests and multiple second requests, each of the first and second requests comprising request data;

assigning, at the data center, based on the request data, a respective processing priority to each of the first and second requests;

processing, at the data center, the first requests based on the assigned processing priorities, while the second requests remain pending for processing;

determining, at the data center, whether to adapt the processing priorities of the second requests based on one or more of the request data of the second requests and response data generated for the first requests, and including: timestamps indicating when the first and the second requests have been generated; and geographical locations from which the second requests originated;

when the determination is affirmative, adapting, at the data center, the processing priorities of the second requests in accordance with one or more of the request data of the second requests and the response data generated for the first requests, such that given second requests originating from a geographical location associated with the data center are assigned a higher processing priority than other second requests originating from respective geographical locations associated with other data centers of the distributed network of data centers, wherein the geographical locations associated with the other data centers are different from the geographical location associated with the data center; and processing the second requests based on the adapted processing priorities.

2. The method of claim 1, wherein the request data comprise:

one or more of senders, originators and recipients of the first and the second requests;

an indication of a type of content data being requested by the first and the second requests to be processed;

an indication of a geographical region.

3. The method of claim 1, wherein the request data is included in one or more of a message header, in one or more data fields of the first and second requests and in a separate data structure associated with the first and second requests.

4. The method of claim 1, wherein adapting the processing priorities is further based on:

processing prior requests received at the computing device prior to the reception of the first and the second requests;

timestamps at which the first and the second requests are received at the computing device.

5. The method of claim 1, wherein the determination whether to adapt the processing priorities is triggered by:

a predefined first time period;

a maximum number of the further requests received at the computing device over a predefined second time period.

6. The method of claim 1, wherein the processing priorities are assigned by using a set of rules maintained at the computing device.

7. The method of claim 6, wherein the processing priorities comprise a score generated by the set of rules.

8. The method of claim 7, wherein the score comprises a numerical range.

9. The method of claim 6, wherein the rules are adapted based on statistical data generated in response to processing the first and the second requests and to the processing of prior requests received prior to the reception of the first and the second requests.

10. The method of claim 9, wherein adapting the rules comprises one or more of activating and deactivating one or more rules of the set of rules.

11. The method of claim 1, wherein processing the second requests comprises a selection of at least one of one or more further computing devices for processing a subset of the second requests, the one or more further computing devices forming a distributed network with the computing device.

12. A computing device for processing requests from at least one requesting client, the computing device being arranged to execute the method of claim 1.

13. A computer program product comprising a non-transitory computer-readable medium storing program code which executes the method of claim 1 when run by a computer.

14. The method of claim 7, wherein the rules are adapted based on statistical data generated in response to processing the first and the second requests and to the processing of prior requests received prior to the reception of the first and the second requests.

15. The method of claim 14, wherein adapting the rules comprises one or more of activating and deactivating one or more rules of the set of rules.

16. The method of claim 8, wherein the rules are adapted based on statistical data generated in response to processing the first and the second requests and to the processing of prior requests received prior to the reception of the first and the second requests.

17. The method of claim 16, wherein adapting the rules comprises one or more of activating and deactivating one or more rules of the set of rules.

\* \* \* \* \*